Sept. 26, 1961    J. G. M. J. DE WOUTERS D'OPLINTER    3,001,462
LIQUID-TIGHT OBJECTIVE FOR UNDERWATER PHOTOGRAPHIC APPARATUS
Filed July 23, 1958
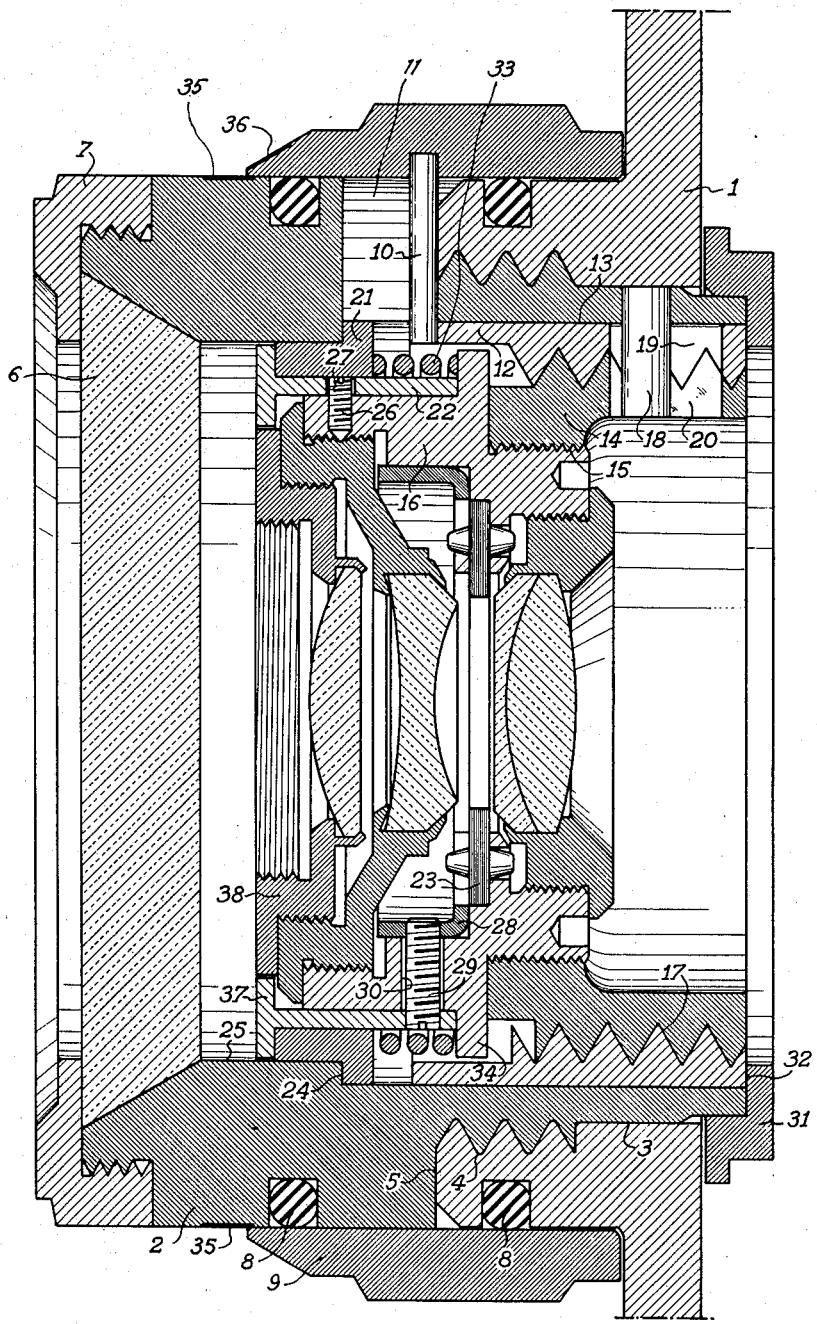
INVENTOR
JEAN GUY MARIE JOSEPH DE WOUTERS
D'OPLINTER.
BY Stone + Mack
ATTORNEYS.

3,001,462
LIQUID-TIGHT OBJECTIVE FOR UNDERWATER PHOTOGRAPHIC APPARATUS

Jean G. M. J. de Wouters d'Oplinter, Roquefort-les-Pins, France, assignor to La Spirotechnique, Paris, France
Filed July 23, 1958, Ser. No. 750,509
2 Claims. (Cl. 95—45)

The present invention relates to the objectives of underwater photographic and television apparatus, and it has for its object to provide an improved assembly comprising the objective, its mounting and its adjustment means which satisfies the following conditions for this type of apparatus.

The focusing and diaphragm control takes place from outside the objective mount without the surrounding water being able to reach the elements of the objective; the forces to be exerted on the control means for the focusing and for the diaphragm are independent of the pressure of the surrounding water; and the distance between the objective optical system and the image-forming plane or the sensitised layer on which the image is to be formed is not influenced by possible deformations of the external casing of the apparatus under the effect of the ambient pressure.

The invention satisfies these essential conditions without having to make use of mechanical devices substantially more complicated than those of the known objectives designed for apparatus of the type in question, and it is mainly characterized in that the objective mount is entirely contained in a lens tube, of which the gaps or openings formed on the one hand to permit its mounting on the external casing of the apparatus and on the other hand to have access to the movable members of the objective to be controlled, open on the external surface of this lens tube in a zone between two fluid-tight packings interposed between the lens tube or that part of the apparatus casing on which it is mounted, and a movable member exposed on all its surfaces outside the said zone to the pressure of the ambient water, the control means for the movable elements of the objective being derived from the displacements of the said member relatively to the lens tube.

As regards the practical embodiments of the invention, the latter is particularly characterized by the following main points.

(1) The movable part on the lens tube is formed by a sleeve which encloses the lens tube, relatively to which it can rotate and slide axially.

(2) The fluid-tight packings interposed between the lens tube or that part of the casing on which it is mounted, and the rotating and sliding sleeve, are formed by toric joints disposed in grooves of the lens tube and the casing on either side of the openings or gaps which exist in the lens tube, and between the latter and the casing.

(3) The rotating and sliding sleeve is provided with a radial arm which extends through an opening in the wall of the lens tube and which, by longitudinal displacement of the sleeve in one direction, comes into engagement with the objective focusing mechanism, and in the other direction with the diaphragm apertures mechanism, one or the other of these two mechanisms being controlled by the rotation of the sleeve.

(4) At least one of the scales which show the focusing and diaphragm adjustments is engraved on the lens tube, a corresponding index being engraved on the rotating and sliding sleeve, and it is masked by the sleeve when the latter is in the position which corresponds to an adjustment other than that indicated by the said scale.

(5) The objective mounting can slide in the lens tube and it is constantly urged by resilient restoring means against an independent reference surface of the external casing of the apparatus and at an invariable distance from the image-forming plane or the sensitised layer on which the image is to be formed.

Other advantageous features of the invention will be apparent from the following description of one embodiment of an objective, to which all the features defined above has been applied. The single figure of the accompanying drawing is an axial section of the objective assembly.

The complete apparatus is disposed in a fluid-tight casing which protect it againt contact with the water and which is designed to resist the pressure of the ambient water at the anticipated depths. One part of the front wall of this external casing is shown at 1 and the objective and all the members associated therewith are contained in a lens tube 2 which is centered in an aperture 3 of the wall 1, the said tube being screwed into a screwthread 4 of the wall and being stopped at 5. The front end of the lens tube is formed by a window 6 secured in liquid-tight manner by a ring 7.

When thus enclosed in the lens tube 2, the objective assembly is only accessible from outside through the wall of the said tube for the purpose of controlling the elements of the said objective. According to the invention, the openings providing access to the objective open in a zone of the lateral surface of the lens tube between two fluid-tight interposed packings which are used to control the two adjustments, namely, the focusing and the diaphragm aperture of the objective.

In the constructional example which is illustrated the two packings are formed by resilient O rings 8 of a well known type, disposed in grooves, one of which is formed in the lens tube and the other in the casing wall to the rear of the connection plane.

The movable member is formed by a sleeve 9 mounted for turning and sliding movement on the lens tube 2, the said sleeve covering in all its positions the rings 8 which bear resiliently against its internal surface. Access of water to the zone between the rings 8 is thus completely prevented, and the sleeve 9, which is wet over its entire external surface, is not subjected by the water to any thrust liable to oppose its rotational or sliding movement on the lens tube or to cause these movements. The sleeve 9 is knurled on its periphery or provided with other gripping means for facilitating the operation thereof, and it is provided with an internal radial arm 10 which engages in an opening 11 in the side wall of the lens tube 2. The dimensions of this opening in the circumferential and longitudinal directions are so determined as to permit the sleeve 9 to carry out the maximum displacements required in both directions.

By bringing the sleeve 9 to its rearward position, the arm 10 can be brought into engagement with the focusing sleeve 12 by engagement of this arm in a notch in the forward end of the said sleeve. The latter is machined and can turn in a bore 13 of the lens tube and it is coupled to a bushing 14 screwed at 15 on the objective mount 16 by a helical thread 17. The bushing 14 is prevented from rotating by a radial pin 18 of the lens tube 2, which extends through a slot 19 in the sleeve 12 and is engaged in a longitudinal groove 20 of the bushing 14. This groove has a width corresponding to the diameter of the pin 18 and is extended longitudinally to permit the bushing 14 and the assembly of which it forms part to be displaced axially when the external sleeve 9 is rotated. The opening 19 of the sleeve 12 is at the same time extended longitudinally and enlarged in its circumferential direction so as to permit the neecssary freedom of movement to this sleeve in the longitudinal and angular directions. By displacing the external sleeve 9 towards its front position, it is possible to bring the arm 10 into a notch formed on the rear face of a ring 21 interposed between the lens tube 2 and the control sleeve 22 of the diaphragm 23. The ring 21 abuts axially against a shoulder 24 of the lens tube 2 and it is made fast in any suitable manner with the sleeve 22 so that the latter can turn therewith in the bore 25 relatively to the objective mount 16, but can also slide axially with the objective assembly relatively to the ring 21. A pin 26 screwed into the mount 16 and engaged in a slot 27 extending circumferentially of the sleeve 22 retains the latter in the axial direction on the objective mount 16, but permits it to turn relatively to the said mount. The sleeve 22 is coupled to the ring 28 which, by rotating in the objective mount 16, controls the diaphragm aperture by means of a finger 29 extending through the mount 16 in a circumferentially extending opening 30.

In order that the distance between the objective optical system and the image-forming plane or the sensitised layer may not be influenced by the deformations of the external casing 1 under the action of the pressure of the surrounding water, the assembly comprising the objective and the members associated therewith is constantly urged axially with respect to the lens tube 2 and the external casing 1 against a ring 31 rigidly secured to the internal chamber of the apparatus and the reference surface 32 of which against the objective assembly bears is at a constant distance from the image-forming plane. This movement of the objective assembly into contact with the ring 31 is advantageously ensured by a single helical spring 33 positioned between the ring 21 and a collar 34 on the objective mount 16. This spring at the same time ensures the taking-up of play in the helical threads 17.

When the sleeve 9 is in the position shown in the drawing, i.e. connected to the focusing control means, its front edge uncovers a scale 35 engraved on the periphery of the lens tube 2 so as to indicate the focus by figures in relation to an index 36 engraved on this front edge. This scale 35 is only uncovered and visible if the sleeve 9 is in a position for controlling the focus. It is concealed when the sleeve 9 is in the position for controlling the diaphragm aperture so that there can be no confusion as regards the adjustments. The scale which corresponds to the diaphragm apertures can be engraved on the lens tube 2 alongside the rear edge of the sleeve 9; it is uncovered when the focusing scale 35 is concealed and vice versa. However, this diaphragm aperture scale can also be engraved on the front face of an annular rim 37 of the sleeve 22 and be observed through the window 6, a fixed index being engraved on the front face of the ring 38 of the objective mount.

What I claim is:

1. In an underwater photographic apparatus of the type enclosed in a fluid tight casing, a liquid tight objective provided with a lens tube rigidly secured in an aperture of the front wall of said casing, an objective mount contained within said lens tube and axially movable with respect thereto, means for securing the rear end of the lens tube to the housing of the internal chamber of the photographic apparatus without contact of the latter with the outer fluid tight casing, and resilient means interposed between the lens tube and the objective mount, for constantly urging the latter against a reference surface provided on said housing at a constant distance from the image forming plane of the photographic apparatus.

2. In an underwater photographic apparatus of the type enclosed in a fluid tight casing, a liquid tight objective provided with a lens tube rigidly secured in an aperture of the front wall of said casing, an objective mount contained within said lens tube and axially movable with respect thereto, an angularly and axially movable member mounted in said lens tube coaxially to the objective mount and coupled with the latter by a helical thread, means outside the lens tube for angularly moving said member, means for securing the rear end of said lens tube to the rigid housing of the internal chamber of the photographic apparatus without contact of the latter with the outer fluid-tight casing, and resilient means interposed between the lens tube and the axially and angularly movable member for constantly urging the same against a reference surface provided on said internal chamber at a constant distance from the image forming plane of the photographic apparatus.

References Cited in the file of this patent

UNITED STATES PATENTS

| 2,126,335 | Langsner | Aug. 9, 1938 |
| 2,856,830 | Meixner et al. | Oct. 21, 1958 |
| 2,912,911 | Miller | Nov. 17, 1959 |

FOREIGN PATENTS

| 1,130,523 | France | Feb. 6, 1957 |
| 769,081 | Great Britain | Feb. 27, 1957 |

OTHER REFERENCES

Underwater Photography, by Schenck and Kendall, published in 1954, pages 62, 68, 69, 83, 84 and 85 cited.